United States Patent
Makikawa et al.

(10) Patent No.: US 9,470,915 B2
(45) Date of Patent: Oct. 18, 2016

(54) TRANSPARENT CERAMIC, METHOD FOR MANUFACTURING SAME, AND MAGNETO-OPTICAL DEVICE

(75) Inventors: Shinji Makikawa, Annaka (JP); Akira Yahagi, Annaka (JP); Akio Ikesue, Nagoya (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 106 days.

(21) Appl. No.: 14/005,053

(22) PCT Filed: Mar. 15, 2012

(86) PCT No.: PCT/JP2012/056632
§ 371 (c)(1),
(2), (4) Date: Sep. 13, 2013

(87) PCT Pub. No.: WO2012/124754
PCT Pub. Date: Sep. 20, 2012

(65) Prior Publication Data
US 2014/0002900 A1    Jan. 2, 2014

(30) Foreign Application Priority Data
Mar. 16, 2011  (JP) .................................. 2011-057766

(51) Int. Cl.
*C04B 35/50* (2006.01)
*G02F 1/09* (2006.01)
(Continued)

(52) U.S. Cl.
CPC .............. *G02F 1/093* (2013.01); *C04B 35/50* (2013.01); *C04B 35/505* (2013.01);
(Continued)

(58) Field of Classification Search
CPC ..................................................... C04B 35/50
See application file for complete search history.

(56) References Cited

U.S. PATENT DOCUMENTS 5,013,696 A   5/1991  Greskovich et al.
6,825,144 B2  11/2004  Hideki et al.
(Continued)

FOREIGN PATENT DOCUMENTS

JP    05-330913 A   12/1993
JP      2638669 B2   8/1997
(Continued)

OTHER PUBLICATIONS

Edited by Ken'ya Hamano, Fine Ceramics Handbook, Asakura Publishing Co., Ltd., Feb. 10 1984, pp. 391-392.
(Continued)

*Primary Examiner* — Angela Ortiz
*Assistant Examiner* — Russell Kemmerle, III
(74) *Attorney, Agent, or Firm* — Westerman, Hattori, Daniels & Adrian, LLP

(57) ABSTRACT

A transparent ceramic having terbium oxide ($Tb_2O_3$) in a molar ratio of at least 40%; and at least one oxide selected among an yttrium oxide, a scandium oxide, and a lanthanide rare earth oxide, wherein (1) the crystal structure of the terbium-oxide-based ceramic does not contain a non-cubic-crystal phase, (2) the mean crystal particle diameter is in a range of 0.5 to 100 μm, and (3) the ceramic comprises a sintering auxiliary having no incidence of deposition of a non-cubic-crystal phase in the crystal structure of the terbium-oxide-based ceramic. This transparent ceramic makes a magneto-optical element that performs at least as well as terbium gallium garnet or other existing monocrystal materials. It also makes a functional element for an optical isolator in the infrared region between 500 nm and 1.5 μm having very little scattering and very few birefringence components.

4 Claims, 2 Drawing Sheets

(51) Int. Cl.
   *C04B 35/505*   (2006.01)
   *C04B 35/645*   (2006.01)
   *C04B 35/626*   (2006.01)
   *G02F 1/00*     (2006.01)

(52) U.S. Cl.
   CPC ...... *C04B 35/62685* (2013.01); *C04B 35/645* (2013.01); *C04B 35/6455* (2013.01); *G02F 1/0036* (2013.01); *C04B 2235/3206* (2013.01); *C04B 2235/3208* (2013.01); *C04B 2235/3217* (2013.01); *C04B 2235/3224* (2013.01); *C04B 2235/3225* (2013.01); *C04B 2235/3232* (2013.01); *C04B 2235/3244* (2013.01); *C04B 2235/3251* (2013.01); *C04B 2235/3286* (2013.01); *C04B 2235/3287* (2013.01); *C04B 2235/3418* (2013.01); *C04B 2235/3852* (2013.01); *C04B 2235/445* (2013.01); *C04B 2235/661* (2013.01); *C04B 2235/664* (2013.01); *C04B 2235/762* (2013.01); *C04B 2235/785* (2013.01); *C04B 2235/786* (2013.01); *C04B 2235/81* (2013.01); *C04B 2235/9653* (2013.01)

(56) References Cited

U.S. PATENT DOCUMENTS

| | | | |
|---|---|---|---|
| 7,427,577 B2* | 9/2008 | Tang et al. | 501/152 |
| 7,592,281 B2* | 9/2009 | Tang et al. | 501/152 |
| 2007/0238604 A1* | 10/2007 | Tang et al. | 501/152 |
| 2009/0011924 A1* | 1/2009 | Tang et al. | 501/152 |
| 2011/0133111 A1 | 6/2011 | Makikawa et al. | |
| 2013/0222909 A1* | 8/2013 | Makikawa et al. | 359/484.03 |
| 2014/0094357 A1* | 4/2014 | Ikari et al. | 501/134 |

FOREIGN PATENT DOCUMENTS

| | | |
|---|---|---|
| JP | 2007-277034 A | 10/2007 |
| JP | 4033451 B2 | 1/2008 |
| JP | 2008-143726 A | 6/2008 |
| JP | 2009-23872 A | 2/2009 |
| JP | 2010-235388 A | 10/2010 |
| JP | 2010-285299 A | 12/2010 |
| JP | 2011-121837 A | 6/2011 |
| WO | 2010/044472 A1 | 4/2010 |
| WO | 2012/046755 A1 | 4/2012 |

OTHER PUBLICATIONS

International Search Report dated Jun. 5, 2012, issued in corresponding application No. PCT/JP2012/056632.

Office Action dated Aug. 19, 2014, issued in corresponding Japanese Patent Application No. 2012-058150 (4 pages).

* cited by examiner

TRANSPARENT CERAMIC, METHOD FOR MANUFACTURING SAME, AND MAGNETO-OPTICAL DEVICE

TECHNICAL FIELD

This invention relates to a transparent ceramic material used to construct a magneto-optical device such as optical isolator, i.e., suited for use in magneto-optical devices, and a method for manufacturing the same. It also relates to a magneto-optical device such as a Faraday rotator and optical isolator.

BACKGROUND ART

With the advance of laser processing machines, magneto-optical devices utilizing the interaction of light and magnetism have recently become of much interest. One of these devices is an isolator, which functions to inhibit the phenomenon that if the light oscillated from a laser source is reflected by the optical system in its path and is returned to the light source, then it disturbs the light oscillated from the laser source, to cause an unstable oscillation state. Accordingly, on use, the optical isolator is arranged between a laser source and an optical member so as to take advantage of the function.

The optical isolator comprises three parts, a Faraday rotator, a polarizer arranged on the light-input side of the Faraday rotator, and an analyzer arranged on the light-output side of the Faraday rotator. The optical isolator utilizes the nature, commonly known as the Faraday effect, that when light enters the Faraday rotator under the condition where a magnetic field is applied to the Faraday rotator in a direction parallel to the light traveling direction, the plane of polarization is rotated in the Faraday rotator. Specifically, a component of the incident light having the same plane of polarisation as that of the polarizer is transmitted by the polarizer and enters the Faraday rotator. The light is rotated by +45 degrees relative to the light-traveling direction in the Faraday rotator, and then emerges therefrom.

By contrast, when the return light entering the Faraday rotator in an opposite direction to the incident direction first passes through the analyser, only a component of the light having the same plane of polarization as that of the analyzer is transmitted by the analyzer and enters the Faraday rotator. In the Faraday rotator, the plane of polarization of the return light is further rotated by +45 degrees in addition to the initial +45 degrees. Since the plane of polarization of the return light is at a right angle of +90 degrees with respect to the polarizer, the return light is not transmitted by the polarizer.

The Faraday rotation angle θ is represented by the following formula (A).

$$\theta = V*H*L \quad (A)$$

In formula (A), V is a Verdet constant which is determined by the material of the Faraday rotator, H is a magnetic flux density, and L is the length of the Faraday rotator. For use as an optical isolator, L is determined so as to give θ=45 degrees.

It is important that the material to be used for the Faraday rotator of the optical isolator mentioned above have a significant Faraday effect and a high transmittance at the wavelength on use.

Also, if a polarized component different from the incident light is generated in the output light, this different polarized component is transmitted by the polarizer, indicating insufficient blockage of the return light.

For the evaluation of the generation of a different polarized component, polarized light of 0 to 90 degrees enters a material used as the Faraday rotator, output light is transmitted by the polarizer into a photodetector, and the intensity of light is measured by the photodetector. From the maximum intensity (Imax) and minimum intensity (Imin), an extinction ratio (S) is computed according to the following equation.

$$S=10 \log(I\text{min}/I\text{max}) \quad \text{(unit: dB)}$$

While higher values of extinction ratio are important, an extinction ratio of at least 30 dB is generally required.

Recently, JP-A 2010-285299 (Patent Document 1) discloses a single crystal oxide of $(Tb_xRe_{1-x})_2O_3$ (wherein $0.4 \leq x \leq 1.0$) and transparent oxide ceramics as the material having a high Verdet constant.

Also JP 4033451 (Patent Document 2) discloses a rare earth oxide represented by the general formula; $R_2O_3$ wherein R is a rare earth element, which is free of birefringence since its crystal structure is cubic. It is described that a sintered body having a high degree of transparency can be produced if pores and impurity segregates are completely removed.

Further, JP-A H05-330913 (Patent Document 3) describes that addition of sintering aids is effective for removing pores. JP 2638669 (Patent Document 4) discloses removal of pores by hot isostatic pressing and re-sintering. One preparation method involves adding one or more of the sintering aids disclosed in JP-A H05-330913 (Patent Document 5) or the like, mixing, compacting, calcining, sintering in vacuum, and HIP treating.

JP-A 2010-285299 (Patent Document 6) discloses a transparent oxide ceramic material of $(Tb_xRe_{1-x})_2O_3$ (wherein $0.4 \leq x \leq 1.0$). Although this ceramic material basically has a cubic crystal structure, it sometimes exhibits faint birefringence because a sintering aid incorporated therein can react with the main component to form a phase different from the cubic crystal that precipitates within crystal grains or at grain boundaries. This may invite a lowering of extinction ratio.

Since the precipitates are of submicron size, laser light irradiated to the ceramic material is scattered there. Due to scattering, the insertion loss may be reduced.

Also when ceramic materials are sintered, the composition of the main component $(Tb_xRe_{1-x})_2O_3$ and the concentration of sintering aid vary between the interior and the outer periphery of the ceramic material due to segregation, resulting in variations of extinction ratio and insertion loss within the ceramic surface.

CITATION LIST

Patent Documents

Patent Document 1: JP-A 2010-285299
Patent Document 2: JP 4033451
Patent Document 3: JP-A H05-330913
Patent Document 4: JP 2638669
Patent Document 5: JP-A H05-330913
Patent Document 6: JP-A 2010-285299

SUMMARY OF INVENTION

Technical Problem

An object of the invention is to provide a transparent ceramic material based on a rare earth oxide containing terbium oxide having a high Verdet constant in a span of wavelength 1.06 µm (0.9 to 1.1 µm) and suited as magneto-optical material, which exhibits in-plane uniformity and high transparency, and minimal scattering, and thus enables to reduce the insertion loss and increase the extinction ratio for thereby offering a magneto-optical material with improved properties; and a method for manufacturing the same. A further object of the invention is to provide a magneto-optical device of quality suited for use in a fiber laser for processing machines.

Solution to Problem

Since a ceramic material containing terbium oxide and an oxide of rare earth element (scandium, yttrium, lanthanum, europium, gadolinium, ytterbium, holmium or lutetium) as main components tends to cause scattering so that the insertion loss may be increased, and inversely, the extinction ratio be reduced, it is very difficult to apply this ceramic material to an optical material for optical isolators posing strict requirements on optical properties.

Under the circumstances, the invention has succeeded in providing an optical ceramic material based on rare earth oxides and having a minimal compositional variation and optical uniformity, by (1) using a starting material having good sinterability and a specific particle size distribution, (2) using a sintering aid having good sinterability and capable of maintaining the ceramic crystal structure cubic, (3) sintering in vacuum or an oxygen-free non-oxidising atmosphere at an optimum temperature and hot isostatic pressing (HIP), and (4) pressure firing the sintered body of step (3) for reducing heterophase precipitates or pores which cause scattering.

Accordingly, the invention provides a transparent ceramic material, a method for manufacturing the same, and a magneto-optical device using the same, as defined below.

{1} A transparent ceramic material comprising at least 40% in molar fraction of terbium oxide (chemical formula $Tb_2O_3$) and at least one oxide selected from, among yttrium oxide, scandium oxide, and a lanthanide rare earth oxide as main components wherein (1) the crystal structure of the terbium oxide-based ceramic material does not contain any heterophase but cubic, (2) the mean crystal grain size is in a range of 0.5 to 100 µm, and (3) the ceramic material comprises a sintering aid which does not cause any heterophase but cubic to precipitate in the crystal structure of the terbium oxide-based ceramic material.

[2] The transparent ceramic material of [1] wherein the sintering aid is an oxide, fluoride or nitride of an element selected from among titanium, zirconium, hafnium and calcium.

[3] The transparent ceramic material of [1] or [2] which has (1) an in-line transmittance of at least 70% at wavelength 1,000 nm and (2) an in-line transmittance of at least 55% at wavelength 600 nm, as measured in a thickness direction of a sample of 10 mm thick.

[4] The transparent ceramic material of any one of [1] to [3] which has an insertion loss of up to 1.2 dB at wavelength 1,065 nm, inclusive of a reflection loss at the end face within a plane of at least 90% of the measurement surface.

[5] The transparent, ceramic material of any one of [1] to [4] which has an extinction ratio of at least 30 dB at wavelength 1,065 nm and within a plane of at least 90% of the measurement surface.

[6] The transparent ceramic material of any one of [1] to [5] which has a refractive index distribution within $5 \times 10^{-5}$ at wavelength 633 nm, as measured at a thickness of 10 mm and on the transmission wavefront in a region of at least 90% of the measurement surface.

[7] A method for manufacturing a transparent ceramic material, comprising;

the first step (1) of grinding and mixing source powders including (a) terbium oxide, (b) at least one oxide selected from among yttrium oxide, scandium oxide, and a lanthanide rare earth oxide, and (c) a sintering aid which does not cause any heterophase but cubic to precipitate in the crystal structure of a terbium oxide-based ceramic material, said source powders having a mean primary particle size of 30 to 2,000 nm, shaping the powder mix to form a green compact, the second step (2) of calcining the green compact at 200 to 1,000° C. in a non-oxidizing or oxidizing atmosphere to form a calcined body, the third step (3) of firing the calcined body at 1,400 to 1,700° C. in a non-oxidising atmosphere to form a fired body, and the fourth step (4) of pressure firing the fired body at 1,400 to 1,800° C. under a pressure of 19 to 196 MPa to form a pressure fired body.

[8] A method for manufacturing a transparent ceramic material, comprising:

the first step (1) of grinding and mixing source powders including (a) terbium oxide, (b) at least one oxide selected from among yttrium oxide, scandium oxide, and a lanthanide rare earth oxide, and (c) a sintering aid which does not cause any heterophase but cubic to precipitate in the crystal structure of a terbium oxide-based ceramic material, said source powders having a mean primary particle size of 30 to 2,000 nm, calcining the powder mix at 200 to 1,000° C. in a non-oxidizing or oxidizing atmosphere, and shaping the powder mix to form a compact, the second step (2) of firing the compact at 1,400 to 1,700° C. in a nan-oxidizing atmosphere to form a fired body, and the third step (3) of pressure firing the fired body at 1,400 to 1,800° C. under a pressure of 19 to 196 MPa to form a pressure fired body.

[9] A method for manufacturing a transparent ceramic material, comprising;

the first step (1) of subjecting an aqueous solution containing (d) terbium ion and (e) at least one rare earth, ion selected from among yttrium ion, scandium ion, and lanthanide rare earth ion to co-precipitation, filtration and calcining to form a powder mix having a mean primary particle size of 30 to 2,000 nm, said powder mix containing at least 40% in molar fraction of terbium oxide and an oxide selected from among yttrium oxide, scandium oxide, and a lanthanide rare earth oxide, the second step (2) of grinding and mixing the powder mix and a sintering aid which is an oxide, fluoride or nitride of an element selected from among titanium, zirconium, hafnium and calcium, and shaping the mixture into a green compact, the third step (3) of firing the green compact at 1,400 to 1,700° C. in a non-oxidizing atmosphere to form a fired body, and the fourth step (4) of pressure firing the fired body at 1,400 to 1,800° C. under a pressure of 19 to 196 MPa to form a pressure fired body.

[10] The method of [7], [8] or [9], further comprising the step of annealing the pressure fired body at 1,500 to 2,000° C. in an oxygen-free atmosphere.

[11] A magneto-optical device constructed using the transparent ceramic material of any one of [1] to [6].

[12] A magneto-optical device comprising a Faraday rotator using the transparent ceramic material of any one of [1] to [6].

[13] The magneto-optical device of [12], which is used as an optical isolator comprising polarizing materials upstream and downstream of the Faraday rotator and operating in a wavelength region of wavelength 1,065 nm.

Advantageous Effects of Invention

The transparent ceramic material of the invention exhibits improved optical properties in the visible to infrared spectrum which are not available with the same ceramic composition described in JP-A 2010-285299. This transparent ceramic makes it possible to provide a magneto-optical device whose performance is equal to or better than the existing monocrystalline materials like terbium gallium garnet.

Since the inventive ceramic material is also improved in optical loss and optical uniformity over the prior art ceramic materials, it contains very few birefringence components, causes little scattering and enables to manufacture a functional device for an optical isolator in the infrared region between about 500 nm and about 1.5 µm.

DESCRIPTION OF EMBODIMENTS

Transparent Ceramic Material

Figure 1:
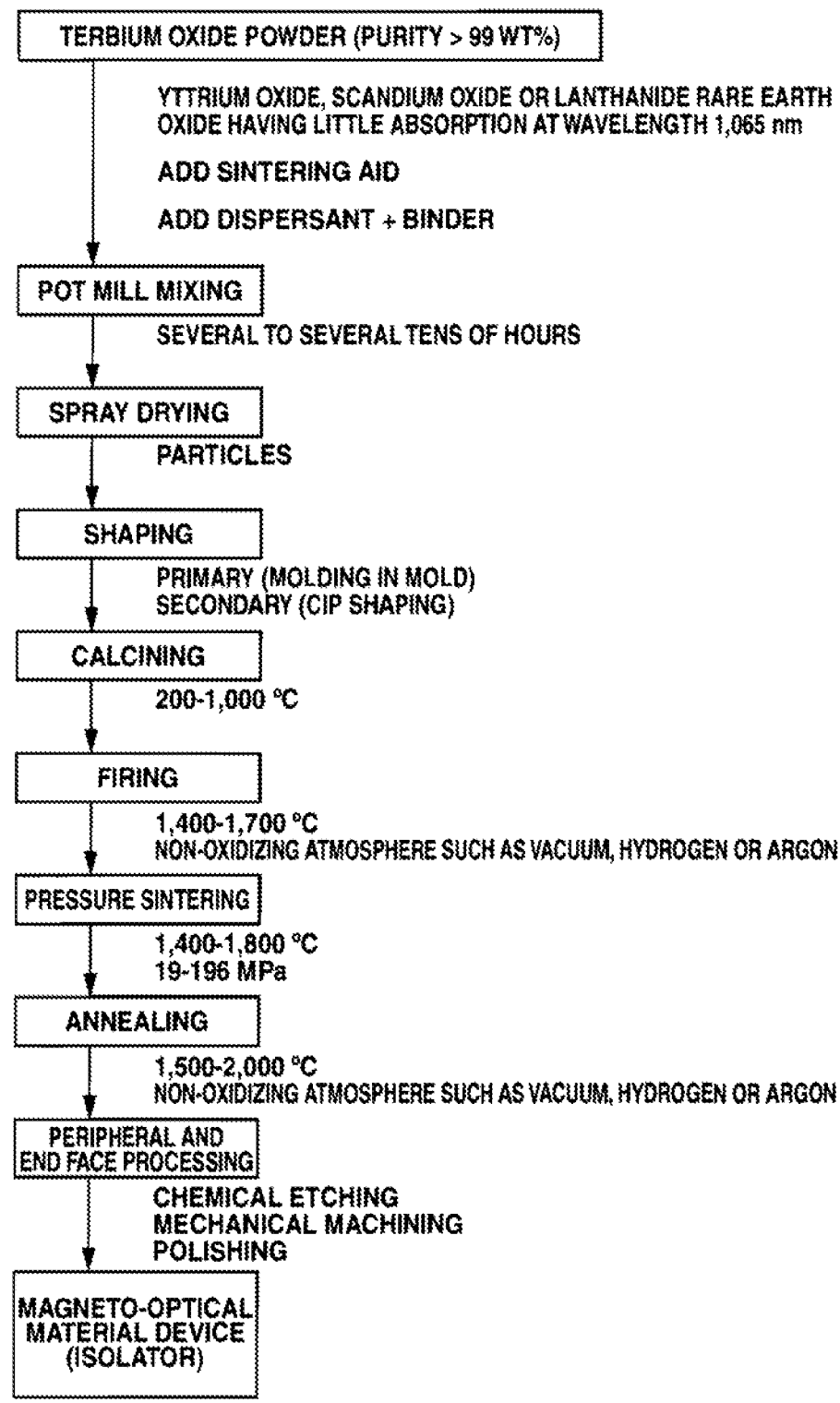
FIG. 1 is a flow sheet illustrating one exemplary method for manufacturing a polycrystalline transparent rare earth oxide ceramic material.

One embodiment of the invention is a transparent ceramic material comprising at least 40% in molar fraction of terbium oxide (chemical formula: $Tb_2O_3$) and at least one oxide selected from among yttrium oxide, scandium oxide, and a lanthanide rare earth oxide, having an absorption of up to 1% at wavelength 1.065 µm as main components, characterized in that (1) the crystal structure of the terbium oxide-based ceramic material does not contain any heterophase other than cubic, (2) the mean crystal grain size is in a range of 0.5 to 100 µm, and (3) the ceramic material comprises a sintering aid which does not cause any heterophase other than cubic to precipitate in the crystal structure of the terbium oxide-based ceramic material.

In the ceramic material comprising terbium oxide (a) and oxide (b), provided that their total is 1 (100 mol %) in molar fraction, terbium oxide (a) is at least 40 mol %, preferably 40 to 60 mol %, with the balance being oxide (b). The ceramic material of the invention consists essentially of terbium oxide (a), oxide (b), and a sintering aid.

It is believed that terbium oxide alone undergoes phase transition from cubic to monoclinic near 1,400-1,600° C. Thus, since a temperature of 1,400 to 1,600° C. is employed in the sintering of a rare earth oxide ceramic material containing terbium oxide, inevitably phase transition from monoclinic to cubic takes place during sintering or cooling. If some monoclinic grains are left without phase transition, these grains become heterophase precipitates, which cause scattering. Also since monoclinic grains are anisotropic, they exhibit birefringence. It is thus recommended to add a sintering aid which promotes smooth phase transition from monoclinic to cubic. As the sintering aid, use may be made of 4A Group elements such as titanium, zirconium and hafnium, calcium, scandium, yttrium, and lanthanide elements having no absorption around wavelength 1.06 µm.

These elements have no absorption around wavelength 1.06 µm. Also, since the 4A Group elements are used as a stabilizer on sintering of yttria, they are effective as a stabilizer for the rare earth oxides containing terbium oxide according to the invention. Since calcium has a strong ionic character and high reactivity, it readily forms a solid solution with rare earth oxides. Other elements except the above-specified elements have problems, for example, since they have absorption around wavelength 1.06 µm or are unlikely to form a solid solution with rare earth oxides, they will precipitate alone without reacting as the sintering aid; because of excessively high activity, the size of crystal grains cannot be controlled to an optimum range; they gradually react with moisture over a long period of time, so that the ceramic material becomes hygroscopic and devitrifies.

Of these elements, the element selected from titanium, zirconium, hafnium and calcium is preferred as the sintering aid. When these elements are incorporated as the sintering aid, most desirably they take the form of oxide, but may take the form of fluoride, nitride or carbide.

Further, the amount of these elements incorporated as the sintering aid is desirably 0.001 to 1% by weight, more desirably 0.01 to 1% by weight of the overall transparent ceramic material. If the amount is below the range, a stable effect of sintering aid is not exerted. If the amount is beyond the range, an extra portion precipitates alone rather than forming a solid solution, which causes scattering.

The inventive ceramic material is polycrystalline. The mean crystal grain size is generally in a range of 0.5 to 100 µm, preferably in a range of 1 to 50 µm. If the mean crystal grain size exceeds 100 µm, there is a drawback that impurities tend to precipitate at the grain boundary, and air bubbles are frequently left in the grain interior or grain boundary, which causes light scattering and deteriorated thermal mechanical properties. It is noted that the mean crystal grain size is an average of lengths of 100 crystal grains in an arbitrary field of view when observed under a scanning electron microscope or optical microscope.

Preferably, the inventive ceramic material has (1) an in-line transmittance of at least 70%, more preferably at least 72%, in the baseline of light transmission at wavelength 1,000 nm and (2) an in-line transmittance of at least 55%, more preferably at least 60%, and even more preferably at least 65%, in the baseline of light transmission at wavelength 600 nm, as measured in a thickness direction of a sample of 10 mm thick.

If the in-line transmittance (1) is less than 70%, or if the in-line transmittance (2) is less than 55%, substantial light scattering occurs at the grain or grain boundary, or substantial light absorption occurs at the grain and so, the material is difficult to use in the application intended herein. As used herein, the term "baseline" refers, in case where absorption of the sintering aid or rare earth oxide such as terbium oxide appears in a transmission spectrum of transmittance versus wavelength, to a transmission spectrum extrapolated on the assumption that the absorption is nil. The in-line transmittance is measured herein by using a spectroscopic analyzer Spectrometer Model U3500 (Hitachi Ltd.), polishing a sample of 6 mm diameter and 10 mm thickness to a surface roughness Rms of up to 1 nm, and projecting a beam with a diameter of 1 to 3 mm.

Preferably, the inventive ceramic material has (1) an insertion loss of up to 1.2 dB, more preferably up to 1 dB, at wavelength 1,065 nm and within a plane of at least 90% of the measurement surface and (2) an extinction ratio of at least 30 dB at wavelength 1,065 nm and within a plane of at least 90% of the measurement surface, as measured in a thickness direction of a sample of 10 mm thick.

If the insertion loss (1) exceeds 1.2 dB, substantial light scattering may occur at the grain or grain boundary, or substantial light absorption occur at the grain and so, the material may be difficult to use in the application intended herein. If the extinction ratio (2) is less than 30 dB, substantial birefringence may occur at the grain or grain boundary, and the material may be difficult to use in the application intended herein.

Herein, the insertion loss is measured by resting a ceramic sample on a V block, directing coherent light of wavelength 1.065 μm and power several mW perpendicular to the ceramic sample, and measuring the light intensity by a semiconductor photodetector. Provided that the light intensity obtained where the ceramic sample is not inserted is a reference, a reduction of the light intensity relative to the reference is expressed in dB unit. It is noted that a sample of 6 mm diameter and 10 mm thickness polished to a surface roughness Rms of up to 1 nm, a surface planarity of up to $\lambda/4$, and a parallelism between opposed end faces of up to $0.5°$ is used. The measurement value includes surface reflection on opposed end faces.

The V block on which the ceramic sample is rested can be moved in a direction perpendicular to the incident light. This enables measurement of the in-plane distribution of the ceramic sample. Accordingly, the distribution in a plane of at least 90% of the measurement surface is obtained by performing measurement at a series of points while moving the V-shaped block to a distance of 95% of the diameter.

Herein, the extinction ratio is determined by resting the ceramic sample on the V block, directing coherent light of wavelength 1.065 μm, power several mW, and polarization 0 degree and 90 degrees to the ceramic sample, directing output light to a semi conductor photodetector via a polarizer, measuring the intensity of light in the photodetector, and calculating an extinction ratio from the maximum intensity (Imax) and minimum intensity (Imin), the extinction ratio being expressed in dB unit. It is noted that a sample of 6 mm diameter and 10 mm thickness polished to a surface roughness Rms of up to 1 nm, a surface planarity of up to $\lambda/4$, and a parallelism between opposed end faces of up to $0.5°$ is used. The V block on which the ceramic sample is rested cam be moved in a direction perpendicular to the incident light. This enables measurement of the in-plane distribution of the ceramic sample. Accordingly, the distribution in a plane of at least 90% of the measurement surface is obtained by performing measurement at a series of points while moving the V-shaped block to a distance of 95% of the diameter.

Also preferably, the ceramic material has a refractive index distribution within $5\times10^{-5}$, more preferably $1\times10^{-6}$ to $2\times10^{-5}$ at wavelength 633 nm, as measured at a thickness of 10 mm and on the transmission wavefront in a region of at least 90% of the measurement surface. It is noted that the refractive index distribution can be determined by using an interferometer G102 (Fujifilm Corp.) and measuring the sample transmission wave front at wavelength 633 nm.

Method for Manufacturing Transparent Ceramic Material

The transparent ceramic material of the invention is preferably manufactured by any one of the following first to third embodiments.

First Embodiment

Solid Phase Reaction

The method for manufacturing a transparent ceramic material comprises;

the first step (1) of grinding and mixing source powders including (a) terbium oxide, (b) at least one oxide selected from among yttrium oxide, scandium oxide, and a lanthanide rare earth oxide, and (c) a sintering aid which does not cause any heterophase but cubic to precipitate in the crystal structure of a terbium oxide-based ceramic material, said source powders having a mean primary particle size of 30 to 2,000 nm, shaping the powder mix to form a green compact, the second step (2) of calcining the green compact at 200 to 1,000° C. in a non-oxidizing or oxidizing atmosphere to form a calcined body, the third step (3) of firing the calcined body at 1,400 to 1,700° C. in a non-oxidising atmosphere to form a fired body, and the fourth step (4) of pressure firing the fired body at 1,400 to 1,800° C. under a pressure of 19 to 196 MPa to form a pressure fired body.

Second Embodiment

Solid Phase Reaction

The method for manufacturing a transparent ceramic material comprises:

the first step (1) of grinding and mixing source powders including (a) terbium oxide, (b) at least one oxide selected from among yttrium oxide, scandium oxide, and a lanthanide rare earth oxide, and (c) a sintering aid which does not cause any heterophase but cubic to precipitate in the crystal structure of a terbium oxide-based ceramic material, said source powders having a mean primary particle size of 30 to 2,000 nm, calcining the powder mix at 200 to 1,000° C. in a non-oxidizing or oxidizing atmosphere, and shaping the powder mix to form a compact, the second step (2) of firing the compact at 1,400 to 1,700° C. in a non-oxidizing atmosphere to form a fired body, and the third step (3) of pressure firing the fired body at 1,400 to 1,800° C. under a pressure of 19 to 196 MPa to form a pressure fired body.

Third Embodiment

The method for manufacturing a transparent ceramic material comprises:

the first step (1) of subjecting an aqueous solution containing (d) terbium ion and (e) at least one rare earth ion selected from among yttrium ion, scandium ion, and lanthanide rare earth ion to co-precipitation, filtration and calcining to form a powder mix having a mean primary particle size of 30 to 2,000 nm, said powder mix containing at least 40% in molar fraction of terbium oxide and an oxide selected from among yttrium oxide, scandium oxide, and a lanthanide rare earth oxide, the second step (2) of grinding and mixing the powder mix and a sintering aid which is an oxide, fluoride or nitride of an element selected from among titanium, zirconium, hafnium, and calcium, and shaping the mixture into a green compact, the third step (3) of firing the green compact at 1,400 to 1,700° C. in a non-oxidising atmosphere to form a fired body, and the fourth step (4) of pressure firing the fired body at 1,400 to 1,800° C. under a pressure of 19 to 196 MPa to form a pressure fired body.

In the first step of the first and second embodiments, (a) terbium oxide, (b) at least one oxide selected from among yttrium oxide, scandium oxide, and a lanthanide rare earth oxide, having little absorption (not more than 1%) at wavelength 1,065 μm, and (c) a sintering aid which does not cause any heterophase other than cubic to precipitate in the crystal structure of a terbium oxide-based ceramic material are used. These source powders having a mean primary particle size of 30 to 2,000 nm, preferably 100 to 2,000 nm are ground, and mixed together.

Herein terbium oxide (a) and oxide (b) are combined in such a molar fraction that terbium oxide (a) is at least 40 mol %, preferably 40 to 60 mol %, with the balance being oxide (b).

Terbium oxide may be prepared by any well-known methods, or commercially available products may be used. In general, most, terbium, oxide has the chemical formula: $Tb_4O_7$ rather than $Tb_2O_3$. Thus $Tb_4O_7$ is used as the source powder. It may be converted to $Tb_2O_3$ by reductive treatment in a hydrogen-containing hot gas atmosphere at 1,000° C. or above, or by holding in a hot air atmosphere at 1,000° C. or above and quenching, prior to use as the source powder. Terbium oxide desirably has a purity of at least 99% by weight, with a purity of at least 99.9% by weight being preferred for use in the optical application.

The other source powder used herein is yttrium oxide, scandium oxide, or a lanthanide rare earth oxide having little absorption at wavelength 1.065 μm, which desirably has a purity of at least 99% by weight, with a purity of at least 99.9% by weight being preferred for use in the optical application, Examples of the sintering aid which does not cause any heterophase other than cubic to precipitate in the crystal structure of a terbium oxide-based ceramic material include 4A Group elements such as titanium, zirconium and hafnium, calcium, scandium, yttrium, and lanthanide elements having no absorption around wavelength 1.06 μm. Inter alia, titanium, zirconium, hafnium, and calcium are preferred. To use these elements in high, purity form, they preferably take the form of oxide. The oxides of these elements desirably have a purity of at least 99% by weight, with a purity of at least 99.9% by weight being preferred for use in the optical application. The amount of these elements incorporated as the sintering aid is desirably 0.001 to 1% by weight, more desirably 0.01 to 1% by weight.

The source powders used in the first step have a primary particle size of 30 to 2,000 nm, preferably 100 to 2,000 nm, and more preferably 200 to 1,000 nm. If the primary particle size is less than 30 nm, the source power is difficult to handle, and there are problems including difficult molding, a low compact density, a high shrinkage factor on sintering, and crack susceptibility. If the primary particle size exceeds 2,000 nm, the source powder is less sinterable, and it is difficult to obtain a sintered body having a high density and transparency. It is noted that the primary particle size may be measured by a similar method as used in the measurement of mean crystal grain size.

These components are mixed in a pot mill or the like, using a standard mixing/grinding medium. Partially stabilized zirconia balls are desired as the grinding medium for the following reason. Since zirconia can also be used as the sintering aid, it is needless to consider the concomitant introduction of zirconia from zirconia balls.

In the pot mill, the source powders and sintering aid and optionally, at least one of dispersant, binder and other additives are admitted. Further, pure water or an organic solvent such as ethyl alcohol is used as a solvent. Milling may be continued for several hours to less than 20 hours. As the dispersant and binder, any compounds used in the manufacture of ceramic material of this type may be used. For example, the dispersant such as ammonium polyacrylate or ammonium polycarboxylate, and the binder such as methyl cellulose, ethyl cellulose, or polyvinyl alcohol may be used in standard amounts.

The resulting slurry is passed through a spray dryer for solvent removal and agglomeration, forming particles of several tens of microns. By subjecting the particles to primary shaping in a given mold and secondary shaping by cold isostatic press (CIP), a green compact may be effectively prepared.

In the first embodiment, after the grinding and mixing step, the powder mix is shaped to form a green compact, the green compact is calcined at 200 to 1,000° C. in a non-oxidizing or oxidizing atmosphere to form a calcined body, and the calcined body is fired at 1,400 to 1,700° C. in a non-oxidizing atmosphere to form a fired body. On the other hand, in the second embodiment, after the grinding and mixing step, the source powders are calcined at 200 to 1,000° C. in a non-oxidizing or oxidizing atmosphere, the calcined powder mix is shaped to form a compact, and the compact is fired at 1,400 to 1,700° C. in a non-oxidizing atmosphere to form a fired body.

Herein, the first embodiment has the advantage that the binder used in the shaping can be oxidized and burnt off by calcination. The second embodiment has the advantage that a change in valence of terbium oxide can be suppressed by firing in a non-oxidizing atmosphere.

In the first embodiment, a compact may be obtained by a shaping procedure of press molding in a mold and subsequent cold isostatic pressing (CIP).

In the first and second embodiments, the calcining step is carried out at 200 to 1,000° C., preferably 400 to 1,000° C., and more preferably 600 to 1,000° C. The calcining atmosphere may be an oxidizing or non-oxidising atmosphere. The oxidizing atmosphere may be air. The non-oxidising atmosphere may be vacuum (e.g., $10^2$ Pa to $10^{-5}$ Pa), reducing atmosphere, or inert gas atmosphere. Although the calcining time varies with the calcining temperature, it is generally about 60 to 180 minutes.

The calcined powder thus obtained may be shaped by a similar procedure as described for the first embodiment. When the compact is fired, it is fired at 1,400 to 1,800° C., preferably 1,400 to 1,600° C., obtaining a fired body. The firing atmosphere is not particularly limited as long as terbium oxide $Tb_4O_7$ is converted to $Tb_2O_3$. For example, the atmosphere may be vacuum, reducing atmosphere, inert gas atmosphere or the like. In the case of vacuum firing, a pressure of $10^2$ Pa to $10^{-5}$ Pa may be used. Although the firing time varies with the firing temperature, it is generally about 30 to 480 minutes. Through the step, the fired body desirably reaches a relative density of at least 90%, more desirably at least 95%.

Next, in the first and second embodiments, the fired body is pressure fired at 1,400 to 1,800° C. in a non-oxidizing atmosphere, yielding a pressure fired body. The pressure firing technique is not particularly limited, and may be hot pressing (HP) or hot isostatic pressing (HIP), for example. Particularly preferred in the practice of the invention is the HIP technique because little strain is introduced due to uniformity of applied pressure. For example, pressure firing may be carried out under conditions including argon gas as the pressure medium, a pressure of 19 to 196 MPa, a time of 1 to 10 hours, especially 1 to 5 hours, and a temperature of 1,400 to 1,800° C., yielding a transparent ceramic material.

In the third embodiment, a terbium ion and a rare earth ion selected from among yttrium ion, scandium ion, and lanthanide rare earth ions are co-precipitated by precipitation with a hydrogen carbonate salt aqueous solution or ammonia. After filtration, the co-precipitate is calcined in the same manner as described for the second embodiment, obtaining a calcined powder mix containing terbium oxide and an oxide selected from among yttrium oxide, scandium oxide and lanthanide rare earth oxides. Since the powder mix at this point should contain at least 40% in molar fraction of terbium oxide, the amount of terbium ion added to the aqueous solution is adjusted so as to achieve the desired molar fraction. The powder mix has a mean primary particle size of 30 to 2,000 nm, preferably 30 to 1,000 nm, and more preferably 30 to 800 nm.

Next, the powder mix and an oxide, fluoride or nitride of an element selected from among titanium, zirconium, hafnium and calcium as a sintering aid are ground and mixed. This is followed by firing at 1,400 to 1,700° C., preferably 1,400 to 1,600° C. in a non-oxidizing atmosphere as in the first and second embodiments, to form a fired body, and pressure firing as in the first and second embodiments to form a pressure fired body.

In the practice of the invention, the following step may be further carried out if necessary or desirable. That is, the pressure fired body resulting from the last step is annealed in an oxygen-free atmosphere at 1,500 to 2,000° C. This is referred to as annealing step, hereinafter.

At the stage past the step of forming a pressure fired body, the terbium oxide-containing ceramic material has some problems. One problem is a possibility that not all terbium have a valence of 3, and crystal defects result therefrom, which can cause light absorption. Another problem is associated with the belief that terbium oxide alone undergoes phase transition from cubic to monoclinic around 1,400 to 1,600° C. Although phase transition from monoclinic to cubic takes place upon sintering or cooling, if some monoclinic grains are left behind without undergoing the phase transition, they become heterophase precipitates, which cause scattering.

Accordingly, to solve these problems, the pressure fired body is annealed in an oxygen-free atmosphere at 1,500 to 2,000° C., causing all terbium to have a valence of 3 and completing phase transition from, monoclinic to cubic during the annealing step. As to the annealing conditions, the annealing atmosphere may be any desired one as long as it is free of oxygen, for example, it may be a vacuum, reducing, or inert gas atmosphere. In the case of vacuum annealing, a pressure of $10^2$ Pa to $10^{-5}$ Pa may be used. The annealing temperature is desirably 1,500 to 2,000° C., more desirably 1,500 to 1,800° C. Also, the annealing time is desirably 2 to 100 hours, more desirably 10 to 80 hours although it varies with the annealing temperature. The cooling time following annealing may be any desired one as long as no cracks are formed, and it is generally 2 to 100 hours, preferably 2 to 50 hours.

In the transparent ceramic material thus obtained, carbon, tungsten and the like from the heater material of which the heater is made, and aluminum, silicon, calcium and the like from the heat insulating material deposit on the outer periphery of the ceramic material during the calcining, firing, pressure firing and annealing steps. They behave as impurities to devitrify the transparent ceramic material. It is then necessary to remove such deposits by chemical etching, mechanical machining or polishing the opposed end surfaces in the thickness direction.

For the chemical etching, the etching solution may be any acidic aqueous solution, for example, of mineral acids such as hydrochloric acid, nitric acid, sulfuric acid and phosphoric acid and organic acids such as malic acid and citric acid. On use of hydrochloric acid, for example, the outer peripheral surface can be etched away to a depth of several hundreds of microns while heating at 60° C. or higher.

In the case of mechanical machining, the surface may be ground to a depth of several hundreds of microns to several millimeters, using a centerless grinding machine or external cylindrical grinding machine for the outer peripheral surface or a surface grinding machine for the opposed end surfaces.

In the case of polishing, the surface may be polished to a depth of several hundreds of microns to several millimeters, by rough polishing with a diamond slurry or SiC slurry, and subsequent precision polishing with colloidal silica or the like.

Through the chemical etching, mechanical machining or polishing, an optical device having improved optical, properties can be formed.

Magnetooptical Material

The oxide, oxide single crystal and ceramic material of the invention are best suited in the magnetooptical material application. In particular, the oxide, oxide single crystal and ceramic material of the invention are suitably used as a Faraday rotator for an optical isolator at a wavelength of 0.9 to 1.1 μm, especially 1,065 nm.

Figure 3:
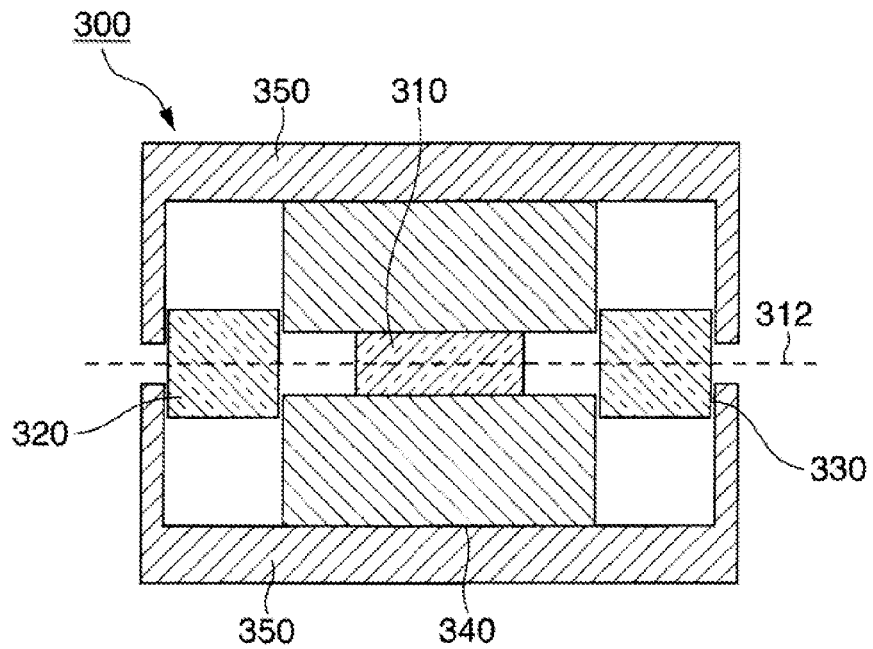
FIG. 3 is a conceptual view of an isolator.

FIG. 3 is a schematic cross-sectional view showing one exemplary optical isolator which is an optical device having a Faraday rotator as an optical component.

In FIG. 3, the optical isolator 300 comprises a Faraday rotator 310, a polarizer 320 and an analyzer 330 of polarizing material arranged upstream and downstream of the Faraday rotator 310. In the optical isolator 300, polarizer 320, Faraday rotator 310 and analyzer 330 are arranged on an optical axis 312 in the order of 320-310-330, and preferably, a magnet 340 is rested on at least one side surface of those components. The magnet 340 is preferably received in a housing 350.

The isolator is preferably used in a fiber laser for a processing machine. Specifically, it is suitably used to prevent the laser light emitted by the laser component from being reflected back to the component to make its oscillation unstable.

EXAMPLES

Examples and Comparative Examples are given below for further illustrating the invention although the invention is not limited thereto.

Examples 1 to 63 and Comparative Examples 1 to 15

Transparent ceramic materials based on terbium oxide-containing rare earth oxides were prepared in accordance with the procedure shown in FIG. 1, using source powders and processing conditions shown in Tables 1 to 7 (Examples) and Tables 8 to 9 (Comparative Examples). It is noted that annealing was omitted in Examples 1 to 9.

A mixture was obtained by adding a predetermined amount of sintering aid to source powders, adding effective amounts of ethyl cellulose and polyvinyl alcohol as dispersant and binder thereto, and mixing them in a pot mill. The mixture was then spray dried to form particles having a particle size of several tens of microns. The particles were molded in a mold as primary shaping and CIP as secondary shaping, obtaining a green compact. The green compact was calcined in air at 200 to 1,000° C., and then fired in a predetermined atmosphere at 1,600 to 1,800° C. The fired body was further subjected to HIP treatment, and optionally annealed, yielding the desired ceramic body (dimensions; diameter 6 mm, length 10 mm). The physical properties of the ceramic bodies thus obtained are shown in Tables.

The heading "crystalline structure as sintered" in Tables 1 to 9 indicates whether the structure consists of cubic grains or a heterophase is detected when a precipitate is observed under an optical microscope and analysed by EBSD or TEM-XRD.

In Tables 1 to 9, transmittance is measured by providing a sample of 10 mm thick and optically polishing both the surfaces thereof. Insertion loss is also measured by providing a sample of 10 mm thick and optically polishing both the surfaces thereof. Since no anti-reflection coating is provided, a reflection loss is inclusive. Extinction ratio is measured by providing a sample of 10 mm thick and optically polishing both the surfaces thereof and detecting the presence or absence of a polarized state.

At the end of pressure sintering and annealing, the sample was dimensioned to have a diameter of 6 mm and a length of 12 mm. As to the peripheral and end face machining, the outer periphery was machined 2 mm and the end surfaces were machined each 1 mm, whereby the sample was ground, polished, etched or otherwise processed to the finish dimensions, a diameter of 4 mm and a length of 10 mm.

According to the invention, a terbium oxide-containing oxide material having predetermined values of average particle size, transmittance at a specific wavelength, insertion loss and extinction ratio is produced for thereby enabling to improve the quality of an optical isolator used in a fiber laser for a processing machine.

Figure 2:
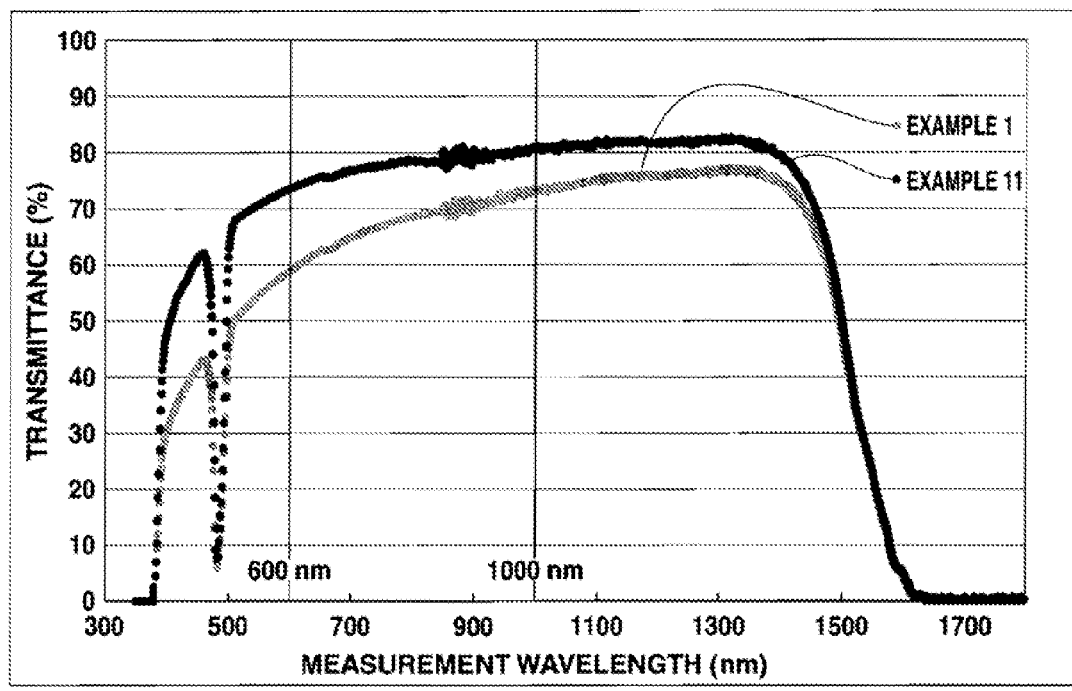
FIG. 2 illustrates the profiles of measured transmittance of transparent ceramic materials.

It is noted that with respect to transmittance versus measurement wavelength including operation wavelength 633 nm and 1,065 nm, FIG. 2 illustrates the "profiles of measured transmittance of transparent ceramic materials." The curves are obtained by plotting the transmittance of Examples 1 and 11 relative to wavelength, respectively. A transmittance of at least 50% is seen over the measurement wavelength range of 500 to 1,500 nm including operation wavelength 633 nm and 1,065 nm, which demonstrates a transmittance of more than 55% or more than 70% at the wavelength 600 nm or 1,000 nm as assigned by the invention.

TABLE 1

| | Example | | | | | | | | |
|---|---|---|---|---|---|---|---|---|---|
| | 1 | 2 | 3 | 4 | 5 | 6 | 7 | 8 | 9 |
| Terbium oxide source powder | | | | | | | | | |
| Primary particle size (nm) | 100 | 500 | 2,000 | 100 | 500 | 2,000 | 100 | 500 | 2,000 |
| Molar fraction (%) | 40 | 40 | 40 | 60 | 60 | 60 | 40 | 40 | 40 |
| Rare earth oxide | | | | | | | | | |
| Type | $Y_2O_3$ | $Y_2O_3$ | $Y_2O_3$ | $Y_2O_3$ | $Y_2O_3$ | $Y_2O_3$ | $Gd_2O_3$ | $Gd_2O_3$ | $Gd_2O_3$ |
| Primary particle size (nm) | 100 | 500 | 2,000 | 100 | 500 | 2,000 | 100 | 500 | 2,000 |
| Molar fraction (%) | 60 | 60 | 60 | 40 | 40 | 40 | 60 | 60 | 60 |
| Sintering aid | | | | | | | | | |
| Type | $ZrO_2$ | $ZrO_2$ | $ZrO_2$ | $ZrO_2$ | $ZrO_2$ | $ZrO_2$ | $ZrO_2$ | $ZrO_2$ | $ZrO_2$ |
| Addition amount (wt %) | 0.5 | 0.5 | 0.5 | 0.5 | 0.5 | 0.5 | 0.5 | 0.5 | 0.5 |
| Calcining | | | | | | | | | |
| Temperature (° C.) | 200 | 200 | 200 | 200 | 300 | 300 | 300 | 300 | 400 |
| Atmosphere | air | air | air | air | air | air | air | air | air |
| Firing | | | | | | | | | |
| Temperature (° C.) | 1,400 | 1,500 | 1,600 | 1,400 | 1,500 | 1,600 | 1,400 | 1,500 | 1,600 |
| Time (hr) | 4 | 4 | 4 | 4 | 4 | 4 | 4 | 4 | 4 |
| Atmosphere | vacuum | vacuum | vacuum | vacuum | vacuum | vacuum | vacuum | vacuum | vacuum |
| HIP | | | | | | | | | |
| Temperature (° C.) | 1,600 | 1,600 | 1,600 | 1,600 | 1,600 | 1,600 | 1,600 | 1,600 | 1,600 |
| Time (hr) | 2 | 2 | 2 | 2 | 2 | 2 | 2 | 2 | 2 |
| Pressure medium | Ar | Ar | Ar | Ar | Ar | Ar | Ar | Ar | Ar |
| Pressure (MPa) | 49 | 49 | 49 | 49 | 49 | 49 | 49 | 49 | 49 |
| Machining | | | | | | | | | |
| Peripheral machining | grinding | grinding | grinding | grinding | grinding | grinding | grinding | grinding | grinding |
| End face machining | etching | etching | etching | etching | etching | etching | etching | etching | etching |
| Sintered body | | | | | | | | | |
| Primary grain size (μm) | 0.5 | 2 | 10 | 0.5 | 2 | 10 | 0.5 | 2 | 10 |
| Transmittance | | | | | | | | | |
| @ 600 nm | 62 | 64 | 65 | 61 | 62 | 64 | 61 | 64 | 64 |
| @1,000 nm | 70 | 72 | 72 | 70 | 71 | 71 | 70 | 72 | 71 |

TABLE 1-continued

|  | Example | | | | | | | | |
| --- | --- | --- | --- | --- | --- | --- | --- | --- | --- |
|  | 1 | 2 | 3 | 4 | 5 | 6 | 7 | 8 | 9 |
| Insertion loss | | | | | | | | | |
| (dB) | 1.0 | 0.98 | 0.98 | 1.0 | 0.98 | 0.98 | 1.0 | 0.98 | 0.98 |
| Extinction loss | | | | | | | | | |
| (dB) | 32 | 35 | 40 | 33 | 36 | 42 | 32 | 36 | 41 |
| Refractive index change | | | | | | | | | |
| $\Delta n \times 10^{-5}$ | 2 | 1 | 3 | 2 | 4 | 1 | 3 | 2 | 1 |
| Crystalline structure as sintered | cubic | cubic | cubic | cubic | cubic | cubic | cubic | cubic | cubic |

TABLE 2

|  | Example | | | | | | | | |
| --- | --- | --- | --- | --- | --- | --- | --- | --- | --- |
|  | 10 | 11 | 12 | 13 | 14 | 15 | 16 | 17 | 18 |
| Terbium oxide source powder | | | | | | | | | |
| Primary particle size (nm) | 100 | 500 | 2,000 | 100 | 500 | 2,000 | 100 | 500 | 2,000 |
| Molar fraction (%) | 40 | 40 | 40 | 40 | 40 | 40 | 40 | 40 | 40 |
| Rare earth oxide | | | | | | | | | |
| Type | $Lu_2O_3$ | $Lu_2O_3$ | $Lu_2O_3$ | $Y_2O_3$ | $Y_2O_3$ | $Y_2O_3$ | $Y_2O_3$ | $Y_2O_3$ | $Y_2O_3$ |
| Primary particle size (nm) | 100 | 500 | 2,000 | 100 | 500 | 2,000 | 100 | 500 | 2,000 |
| Molar fraction (%) | 60 | 60 | 60 | 60 | 60 | 60 | 60 | 60 | 60 |
| Sintering aid | | | | | | | | | |
| Type | $ZrO_2$ | $ZrO_2$ | $ZrO_2$ | $HfO_2$ | $HfO_2$ | $HfO_2$ | $TiO_2$ | $TiO_2$ | $TiO_2$ |
| Addition amount (wt %) | 0.5 | 0.5 | 0.5 | 0.5 | 0.5 | 0.5 | 0.5 | 0.5 | 0.5 |
| Calcining | | | | | | | | | |
| Temperature (° C.) | 400 | 400 | 400 | 500 | 500 | 500 | 500 | 500 | 500 |
| Atmosphere | air | air | air | air | air | air | air | air | air |
| Piring | | | | | | | | | |
| Temperature (° C.) | 1,400 | 1,500 | 1,600 | 1,400 | 1,500 | 1,600 | 1,400 | 1,500 | 1,600 |
| Time (hr) | 4 | 4 | 4 | 4 | 4 | 4 | 4 | 4 | 4 |
| Atmosphere | vacuum | vacuum | vacuum | vacuum | vacuum | vacuum | vacuum | vacuum | vacuum |
| HIP | | | | | | | | | |
| Temperature (° C.) | 1,600 | 1,600 | 1,600 | 1,600 | 1,600 | 1,600 | 1,600 | 1,600 | 1,600 |
| Time (hr) | 2 | 2 | 2 | 2 | 2 | 2 | 2 | 2 | 2 |
| Pressure medium | Ar | Ar | Ar | Ar | Ar | Ar | Ar | Ar | Ar |
| Pressure (MPa) | 49 | 49 | 49 | 49 | 49 | 49 | 49 | 49 | 49 |
| Annealing | | | | | | | | | |
| Temperature (° C.) | 1,400 | 1,500 | 1,600 | 1,400 | 1,500 | 1,600 | 1,400 | 1,500 | 1,600 |
| Time (hr) | 4 | 4 | 4 | 4 | 4 | 4 | 4 | 4 | 4 |
| Atmosphere | vacuum | vacuum | vacuum | vacuum | vacuum | vacuum | vacuum | vacuum | vacuum |
| Machining | | | | | | | | | |
| Peripheral machining | grinding | grinding | grinding | grinding | grinding | grinding | grinding | grinding | grinding |
| End face machining | etching | etching | etching | etching | etching | etching | etching | etching | etching |
| Sintered body | | | | | | | | | |
| Primary grain size (μm) | 0.6 | 1.5 | 8 | 1 | 3 | 20 | 2 | 5 | 50 |
| Transmittance | | | | | | | | | |
| @ 600 nm | 61 | 63 | 66 | 61 | 62 | 64 | 61 | 64 | 64 |
| @1,000 nm | 71 | 72 | 72 | 70 | 72 | 71 | 71 | 72 | 71 |
| Insertion loss | | | | | | | | | |
| (dB) | 1.0 | 0.98 | 1.0 | 1.0 | 0.98 | 0.98 | 1.0 | 1.0 | 0.98 |
| Extinction loss | | | | | | | | | |
| (dB) | 33 | 35 | 36 | 32 | 37 | 40 | 33 | 35 | 40 |

TABLE 2-continued

| | Example | | | | | | | | |
|---|---|---|---|---|---|---|---|---|---|
| | 10 | 11 | 12 | 13 | 14 | 15 | 16 | 17 | 18 |
| Refractive index change | | | | | | | | | |
| $\Delta n \times 10^{-5}$ | 2 | 2 | 1 | 2 | 3 | 2 | 2 | 2 | 4 |
| Crystalline structure as sintered | cubic | cubic | cubic | cubic | cubic | cubic | cubic | cubic | cubic |

TABLE 3

| | Example | | | | | | | | |
|---|---|---|---|---|---|---|---|---|---|
| | 19 | 20 | 21 | 22 | 23 | 24 | 25 | 26 | 27 |
| Terbium oxide source powder | | | | | | | | | |
| Primary particle size (nm) | 100 | 500 | 2,000 | 100 | 500 | 2,000 | 100 | 500 | 2,000 |
| Molar fraction (%) | 60 | 60 | 60 | 60 | 60 | 60 | 60 | 60 | 60 |
| Rare earth oxide | | | | | | | | | |
| Type | $Y_2O_3$ | $Y_2O_3$ | $Y_2O_3$ | $Y_2O_3$ | $Y_2O_3$ | $Y_2O_3$ | $Y_2O_3$ | $Y_2O_3$ | $Y_2O_3$ |
| Primary particle size (nm) | 100 | 500 | 2,000 | 100 | 500 | 2,000 | 100 | 500 | 2,000 |
| Molar fraction (%) | 40 | 40 | 40 | 40 | 40 | 40 | 40 | 40 | 40 |
| Sintering aid | | | | | | | | | |
| Type | $Al_2O_3$ | $Al_2O_3$ | $Al_2O_3$ | $Ga_2O_3$ | $Ga_2O_3$ | $Ga_2O_3$ | MgO | MgO | MgO |
| Addition amount (wt %) | 0.1 | 0.1 | 0.1 | 0.8 | 0.8 | 0.8 | 0.002 | 0.002 | 0.002 |
| Calcining | | | | | | | | | |
| Temperature (° C.) | 600 | 600 | 600 | 600 | 600 | 600 | 600 | 600 | 600 |
| Atmosphere | air | air | air | air | air | air | air | air | air |
| Firing | | | | | | | | | |
| Temperature (° C.) | 1,400 | 1,500 | 1,600 | 1,400 | 1,500 | 1,600 | 1,400 | 1,500 | 1,600 |
| Time (hr) | 4 | 4 | 4 | 4 | 4 | 4 | 4 | 4 | 4 |
| Atmosphere | vacuum | vacuum | vacuum | vacuum | vacuum | vacuum | vacuum | vacuum | vacuum |
| HIP | | | | | | | | | |
| Temperature (° C.) | 1,600 | 1,600 | 1,600 | 1,600 | 1,600 | 1,600 | 1,600 | 1,600 | 1,600 |
| Time (hr) | 2 | 2 | 2 | 2 | 2 | 2 | 2 | 2 | 2 |
| Pressure medium | Ar | Ar | Ar | Ar | Ar | Ar | Ar | Ar | Ar |
| Pressure (MPa) | 49 | 49 | 49 | 49 | 49 | 49 | 49 | 49 | 49 |
| Annealing | | | | | | | | | |
| Temperature (° C.) | 1,600 | 1,700 | 1,800 | 1,600 | 1,700 | 1,800 | 1,600 | 1,700 | 1,800 |
| Time (hr) | 4 | 4 | 4 | 4 | 4 | 4 | 4 | 4 | 4 |
| Atmosphere | vacuum | vacuum | vacuum | vacuum | vacuum | vacuum | vacuum | vacuum | vacuum |
| Machining | | | | | | | | | |
| Peripheral machining | grinding | grinding | grinding | grinding | grinding | grinding | grinding | grinding | grinding |
| End face machining | etching | etching | etching | etching | etching | etching | etching | etching | etching |
| Sintered body | | | | | | | | | |
| Primary grain size (μm) | 2 | 12 | 60 | 3 | 20 | 75 | 10 | 25 | 80 |
| Transmittance | | | | | | | | | |
| @ 600 nm | 60 | 62 | 62 | 61 | 61 | 62 | 61 | 62 | 63 |
| @ 1,000 nm | 70 | 71 | 72 | 71 | 71 | 71 | 70 | 72 | 71 |
| Insertion loss | | | | | | | | | |
| (dB) | 1.0 | 0.99 | 0.98 | 1.0 | 0.98 | 0.98 | 1.0 | 1.0 | 1.0 |
| Extinction loss | | | | | | | | | |
| (dB) | 39 | 36 | 36 | 31 | 32 | 33 | 35 | 34 | 38 |
| Refractive index change | | | | | | | | | |
| $\Delta n \times 10^{-5}$ | 3 | 2 | 2 | 4 | 3 | 2 | 2 | 1 | 3 |
| Crystalline structure as sintered | cubic | cubic | cubic | cubic | cubic | cubic | cubic | cubic | cubic |

TABLE 4

| | Example | | | | | | | | |
|---|---|---|---|---|---|---|---|---|---|
| | 28 | 29 | 30 | 31 | 32 | 33 | 34 | 35 | 36 |
| Terbium oxide source powder | | | | | | | | | |
| Primary particle size (nm) | 100 | 500 | 2,000 | 100 | 500 | 2,000 | 100 | 500 | 2,000 |
| Molar fraction (%) | 60 | 60 | 60 | 60 | 60 | 60 | 60 | 60 | 60 |
| Rare earth oxide | | | | | | | | | |
| Type | $Y_2O_3$ | $Y_2O_3$ | $Y_2O_3$ | $Y_2O_3$ | $Y_2O_3$ | $Y_2O_3$ | $Y_2O_3$ | $Y_2O_3$ | $Y_2O_3$ |
| Primary particle size (nm) | 100 | 500 | 2,000 | 100 | 500 | 2,000 | 100 | 500 | 2,000 |
| Molar fraction (%) | 40 | 40 | 40 | 40 | 40 | 40 | 40 | 40 | 40 |
| Sintering aid | | | | | | | | | |
| Type | CaO | CaO | CaO | $SiO_2$ | $SiO_2$ | $SiO_2$ | $GeO_2$ | $GeO_2$ | $GeO_2$ |
| Addition amount (wt %) | 0.01 | 0.01 | 0.01 | 0.8 | 0.8 | 0.8 | 1.0 | 1.0 | 1.0 |
| Calcining | | | | | | | | | |
| Temperature (° C.) | 600 | 600 | 600 | 800 | 800 | 800 | 1,000 | 1,000 | 1,000 |
| Atmosphere | air | air | air | air | air | air | air | air | air |
| Firing | | | | | | | | | |
| Temperature (° C.) | 1,400 | 1,500 | 1,600 | 1,400 | 1,500 | 1,600 | 1,400 | 1,500 | 1,600 |
| Time (hr) | 4 | 4 | 4 | 4 | 4 | 4 | 4 | 4 | 4 |
| Atmosphere | vacuum | vacuum | vacuum | vacuum | vacuum | vacuum | vacuum | vacuum | vacuum |
| HIP | | | | | | | | | |
| Temperature (° C.) | 1,600 | 1,600 | 1,600 | 1,600 | 1,600 | 1,600 | 1,600 | 1,600 | 1,600 |
| Time (hr) | 2 | 2 | 2 | 2 | 2 | 2 | 2 | 2 | 2 |
| Pressure medium | Ar | Ar | Ar | Ar | Ar | Ar | Ar | Ar | Ar |
| Pressure (MPa) | 49 | 49 | 49 | 49 | 49 | 49 | 49 | 49 | 49 |
| Annealing | | | | | | | | | |
| Temperature (° C.) | 1,600 | 1,700 | 1,800 | 1,600 | 1,700 | 1,800 | 1,600 | 1,700 | 1,800 |
| Time (hr) | 4 | 4 | 4 | 4 | 4 | 4 | 4 | 4 | 4 |
| Atmosphere | vacuum | vacuum | vacuum | vacuum | vacuum | vacuum | vacuum | vacuum | vacuum |
| Machining | | | | | | | | | |
| Peripheral machining | grinding | grinding | grinding | grinding | grinding | grinding | grinding | grinding | grinding |
| End face machining | etching | etching | etching | etching | etching | etching | etching | etching | etching |
| Sintered body | | | | | | | | | |
| Primary grain size (μm) | 10 | 50 | 100 | 1 | 3 | 5 | 0.5 | 1 | 1 |
| Transmittance | | | | | | | | | |
| @ 600 nm | 62 | 63 | 64 | 63 | 62 | 63 | 60 | 60 | 60 |
| @ 1,000 nm | 71 | 71 | 72 | 71 | 71 | 71 | 70 | 71 | 70 |
| Insertion loss | | | | | | | | | |
| (dB) | 1.0 | 0.99 | 0.98 | 1.0 | 0.98 | 0.98 | 1.0 | 1.0 | 1.0 |
| Extinction loss | | | | | | | | | |
| (dB) | 38 | 40 | 42 | 40 | 35 | 35 | 31 | 30 | 32 |
| Refractive index change | | | | | | | | | |
| $\Delta n \times 10^{-5}$ | 1 | 2 | 3 | 2 | 4 | 3 | 2 | 5 | 2 |
| Crystalline structure as sintered | cubic | cubic | cubic | cubic | cubic | cubic | cubic | cubic | cubic |

TABLE 5

| | Example | | | | | | | | |
|---|---|---|---|---|---|---|---|---|---|
| | 37 | 38 | 39 | 40 | 41 | 42 | 43 | 44 | 45 |
| Terbium oxide source powder | | | | | | | | | |
| Primary particle size (nm) | 100 | 500 | 2,000 | 100 | 500 | 2,000 | 100 | 500 | 2,000 |
| Molar fraction (%) | 60 | 60 | 60 | 60 | 60 | 60 | 60 | 60 | 60 |
| Rare earth oxide | | | | | | | | | |
| Type | $Y_2O_3$ | $Y_2O_3$ | $Y_2O_3$ | $Y_2O_3$ | $Y_2O_3$ | $Y_2O_3$ | $Y_2O_3$ | $Y_2O_3$ | $Y_2O_3$ |
| Primary particle size (nm) | 100 | 500 | 2,000 | 100 | 500 | 2,000 | 100 | 500 | 2,000 |
| Molar fraction (%) | 40 | 40 | 40 | 40 | 40 | 40 | 40 | 40 | 40 |

TABLE 5-continued

| | Example | | | | | | | | |
|---|---|---|---|---|---|---|---|---|---|
| | 37 | 38 | 39 | 40 | 41 | 42 | 43 | 44 | 45 |
| Sintering aid | | | | | | | | | |
| Type | $ZrO_2$ | $ZrO_2$ | $ZrO_2$ | $ZrO_2$ | $ZrO_2$ | $ZrO_2$ | $ZrO_2$ | $ZrO_2$ | $ZrO_2$ |
| Addition amount (wt %) | 0.5 | 0.5 | 0.5 | 0.5 | 0.5 | 0.5 | 0.5 | 0.5 | 0.5 |
| Calcining | | | | | | | | | |
| Temperature (° C.) | 400 | 400 | 400 | 400 | 400 | 400 | 400 | 400 | 400 |
| Atmosphere | air | air | air | air | air | air | air | air | air |
| Piring | | | | | | | | | |
| Temperature (° C.) | 1,400 | 1,500 | 1,600 | 1,400 | 1,500 | 1,600 | 1,400 | 1,500 | 1,600 |
| Time (hr) | 4 | 4 | 4 | 4 | 4 | 4 | 4 | 4 | 4 |
| Atmosphere | vacuum | vacuum | vacuum | vacuum | vacuum | vacuum | vacuum | vacuum | vacuum |
| HIP | | | | | | | | | |
| Temperature (° C.) | 1,400 | 1,600 | 1,800 | 1,400 | 1,600 | 1,800 | 1,400 | 1,600 | 1,800 |
| Time (hr) | 2 | 2 | 2 | 2 | 2 | 2 | 2 | 2 | 2 |
| Pressure medium | Ar | Ar | Ar | Ar | Ar | Ar | Ar | Ar | Ar |
| Pressure (MPa) | 49 | 49 | 49 | 49 | 49 | 49 | 98 | 98 | 98 |
| Annealing | | | | | | | | | |
| Temperature (° C.) | 1,800 | 1,900 | 2,000 | 1,800 | 1,900 | 2,000 | 1,800 | 1,900 | 2,000 |
| Time (hr) | 12 | 12 | 12 | 24 | 24 | 4 | 48 | 48 | 48 |
| Atmosphere | vacuum | vacuum | vacuum | vacuum | vacuum | vacuum | vacuum | vacuum | vacuum |
| Machining | | | | | | | | | |
| Peripheral machining | grinding | grinding | grinding | grinding | grinding | grinding | grinding | grinding | grinding |
| End face machining | etching | etching | etching | etching | etching | etching | etching | etching | etching |
| Sintered body | | | | | | | | | |
| Primary grain size (μm) | 20 | 60 | 100 | 30 | 70 | 100 | 30 | 80 | 100 |
| Transmittance | | | | | | | | | |
| @ 600 nm | 63 | 63 | 64 | 63 | 62 | 62 | 62 | 62 | 63 |
| @1,000 nm | 72 | 72 | 72 | 72 | 72 | 72 | 72 | 72 | 72 |
| Insertion loss | | | | | | | | | |
| (dB) | 1.0 | 1.0 | 0.98 | 1.0 | 0.99 | 0.99 | 1.0 | 1.0 | 1.0 |
| Extinction loss | | | | | | | | | |
| (dB) | 39 | 42 | 42 | 42 | 42 | 43 | 41 | 41 | 42 |
| Refractive index change | | | | | | | | | |
| $\Delta n \times 10^{-5}$ | 1 | 2 | 2 | 3 | 2 | 1 | 2 | 2 | 1 |
| Crystalline structure as sintered | cubic | cubic | cubic | cubic | cubic | cubic | cubic | cubic | cubic |

TABLE 6

| | Example | | | | | | | | |
|---|---|---|---|---|---|---|---|---|---|
| | 46 | 47 | 48 | 49 | 50 | 51 | 52 | 53 | 54 |
| Terbium oxide source powder | | | | | | | | | |
| Primary particle size (nm) | 200 | 200 | 200 | 200 | 200 | 200 | 200 | 200 | 200 |
| Molar fraction (%) | 60 | 60 | 60 | 60 | 60 | 60 | 60 | 60 | 60 |
| Rare earth oxide | | | | | | | | | |
| Type | $Y_2O_3$ | $Y_2O_3$ | $Y_2O_3$ | $Y_2O_3$ | $Y_2O_3$ | $Y_2O_3$ | $Y_2O_3$ | $Y_2O_3$ | $Y_2O_3$ |
| Primary particle size (nm) | 200 | 200 | 200 | 200 | 200 | 200 | 200 | 200 | 200 |
| Molar fraction (%) | 40 | 40 | 40 | 40 | 40 | 40 | 40 | 40 | 40 |
| Sintering aid | | | | | | | | | |
| Type | $ZrO_2$ | $ZrO_2$ | $ZrO_2$ | $ZrO_2$ | $ZrO_2$ | $ZrO_2$ | $ZrO_2$ | $ZrO_2$ | $ZrO_2$ |
| Addition amount (wt %) | 0.5 | 0.5 | 0.5 | 0.5 | 0.5 | 0.5 | 0.5 | 0.5 | 0.5 |
| Calcining | | | | | | | | | |
| Temperature (° C.) | 400 | 400 | 400 | 400 | 400 | 400 | 400 | 400 | 400 |
| Atmosphere | air | air | air | air | air | air | air | air | air |

TABLE 6-continued

| | Example | | | | | | | | |
|---|---|---|---|---|---|---|---|---|---|
| | 46 | 47 | 48 | 49 | 50 | 51 | 52 | 53 | 54 |
| Piring | | | | | | | | | |
| Temperature (° C.) | 1,400 | 1,500 | 1,600 | 1,400 | 1,500 | 1,600 | 1,400 | 1,500 | 1,600 |
| Time (hr) | 4 | 4 | 4 | 4 | 4 | 4 | 4 | 4 | 4 |
| Atmosphere | vacuum | vacuum | vacuum | vacuum | vacuum | vacuum | vacuum | vacuum | vacuum |
| HIP | | | | | | | | | |
| Temperature (° C.) | 1,400 | 1,600 | 1,800 | 1,400 | 1,600 | 1,800 | 1,400 | 1,600 | 1,800 |
| Time (hr) | 2 | 2 | 2 | 4 | 4 | 4 | 2 | 2 | 2 |
| Pressure medium | Ar | Ar | Ar | Ar | Ar | Ar | Ar | Ar | Ar |
| Pressure (MPa) | 196 | 196 | 196 | 19 | 19 | 19 | 98 | 98 | 98 |
| Annealing | | | | | | | | | |
| Temperature (° C.) | 1,800 | 1,800 | 2,000 | 1,800 | 1,900 | 2,000 | — | — | — |
| Time (hr) | 72 | 96 | 96 | 72 | 96 | 96 | — | — | — |
| Atmosphere | vacuum | vacuum | vacuum | vacuum | vacuum | vacuum | — | — | — |
| Machining | | | | | | | | | |
| Peripheral machining | grinding | grinding | grinding | grinding | grinding | grinding | grinding | grinding | grinding |
| End face machining | etching | etching | etching | etching | etching | etching | etching | etching | etching |
| Sintered body | | | | | | | | | |
| Primary grain size (μm) | 20 | 60 | 100 | 10 | 20 | 20 | 30 | 80 | 100 |
| Transmittance | | | | | | | | | |
| @600 nm | 63 | 63 | 64 | 60 | 61 | 61 | 60 | 61 | 61 |
| @1,000 nm | 72 | 72 | 72 | 70 | 70 | 71 | 70 | 70 | 71 |
| Insertion loss | | | | | | | | | |
| (dB) | 1.0 | 1.0 | 0.98 | 1.0 | 1.0 | 1.0 | 1.0 | 1.0 | 1.0 |
| Extinction loss | | | | | | | | | |
| (dB) | 39 | 42 | 42 | 30 | 31 | 31 | 31 | 32 | 31 |
| Refractive index change | | | | | | | | | |
| Δn × $10^{-5}$ | 2 | 2 | 1 | 4 | 2 | 3 | 2 | 3 | 5 |
| Crystalline structure as sintered | cubic | cubic | cubic | cubic | cubic | cubic | cubic | cubic | cubic |

TABLE 7

| | Example | | | | | | | | |
|---|---|---|---|---|---|---|---|---|---|
| | 55 | 56 | 57 | 58 | 59 | 60 | 61 | 62 | 63 |
| Terbium oxide source powder | | | | | | | | | |
| Primary particle size (nm) | 200 | 200 | 200 | 200 | 200 | 200 | 200 | 200 | 200 |
| Molar fraction (%) | 60 | 60 | 60 | 60 | 60 | 60 | 60 | 60 | 60 |
| Rare earth oxide | | | | | | | | | |
| Type | $Y_2O_3$ | $Y_2O_3$ | $Y_2O_3$ | $Y_2O_3$ | $Y_2O_3$ | $Y_2O_3$ | $Y_2O_3$ | $Y_2O_3$ | $Y_2O_3$ |
| Primary particle size (nm) | 200 | 200 | 200 | 200 | 200 | 200 | 200 | 200 | 200 |
| Molar fraction (%) | 40 | 40 | 40 | 40 | 40 | 40 | 40 | 40 | 40 |
| Sintering aid | | | | | | | | | |
| Type | $ZrO_2$ | $ZrO_2$ | $ZrO_2$ | $ZrO_2$ | $ZrO_2$ | $ZrO_2$ | $ZrO_2$ | $ZrO_2$ | $ZrO_2$ |
| Addition amount (wt %) | 0.5 | 0.5 | 0.5 | 0.5 | 0.5 | 0.5 | 0.5 | 0.5 | 0.5 |
| Calcining | | | | | | | | | |
| Temperature (° C.) | 400 | 400 | 400 | 400 | 500 | 600 | 400 | 400 | 400 |
| Atmosphere | air | air | air | steam + 10% nitrogen | steam + 10% nitrogen | steam + 10% nitrogen | air | air | air |
| Piring | | | | | | | | | |
| Temperature (° C.) | 1,600 | 1,600 | 1,600 | 1,600 | 1,600 | 1,600 | 1,600 | 1,600 | 1,600 |
| Time (hr) | 4 | 4 | 4 | 4 | 4 | 4 | 4 | 4 | 4 |
| Atmosphere | argon | hydrogen + argon | only hydrogen | vacuum | vacuum | vacuum | vacuum | vacuum | vacuum |

TABLE 7-continued

|  | Example |  |  |  |  |  |  |  |  |
|---|---|---|---|---|---|---|---|---|---|
|  | 55 | 56 | 57 | 58 | 59 | 60 | 61 | 62 | 63 |
| HIP |  |  |  |  |  |  |  |  |  |
| Temperature (° C.) | 1,700 | 1,700 | 1,700 | 1,700 | 1,700 | 1,700 | 1,700 | 1,700 | 1,700 |
| Time (hr) | 4 | 4 | 4 | 4 | 4 | 4 | 4 | 4 | 4 |
| Pressure medium | Ar | Ar | Ar | Ar | Ar | Ar | Ar | Ar | Ar |
| Pressure (MPa) | 196 | 196 | 196 | 196 | 196 | 196 | 196 | 196 | 196 |
| Annealing |  |  |  |  |  |  |  |  |  |
| Temperature (° C.) | 1,800 | 1,800 | 1,800 | 1,800 | 1,800 | 1,800 | 1,800 | 1,800 | 1,800 |
| Time (hr) | 72 | 72 | 72 | 72 | 72 | 72 | 72 | 72 | 72 |
| Atmosphere | vacuum | vacuum | vacuum | vacuum | vacuum | vacuum | vacuum | vacuum | vacuum |
| Machining |  |  |  |  |  |  |  |  |  |
| Peripheral machining | grinding | grinding | grinding | grinding | grinding | grinding | grinding | grinding | grinding |
| End face machining | etching | etching | etching | etching | etching | etching | etching | etching | polishing |
| Sintered body |  |  |  |  |  |  |  |  |  |
| Primary grain size (μm) | 10 | 5 | 3 | 3 | 10 | 20 | 30 | 80 | 100 |
| Transmittance |  |  |  |  |  |  |  |  |  |
| @ 600 nm | 63 | 61 | 60 | 60 | 61 | 61 | 60 | 61 | 61 |
| @ 1,000 nm | 72 | 71 | 70 | 70 | 70 | 70 | 70 | 70 | 71 |
| Insertion loss |  |  |  |  |  |  |  |  |  |
| (dB) | 1.0 | 1.0 | 0.98 | 1.89 | 1.98 | 1.98 | 1.0 | 0.99 | 0.98 |
| Extinction loss |  |  |  |  |  |  |  |  |  |
| (dB) | 39 | 35 | 31 | 31 | 32 | 32 | 33 | 35 | 36 |
| Refractive index change |  |  |  |  |  |  |  |  |  |
| $\Delta n \times 10^{-5}$ | 4 | 5 | 3 | 2 | 3 | 1 | 1 | 3 | 2 |
| Crystalline structure as sintered | cubic | cubic | cubic | cubic | cubic | cubic | cubic | cubic | cubic |

TABLE 8

|  | Comparative Example |  |  |  |  |  |  |  |  |
|---|---|---|---|---|---|---|---|---|---|
|  | 1 | 2 | 3 | 4 | 5 | 6 | 7 | 8 | 9 |
| Terbium oxide source powder |  |  |  |  |  |  |  |  |  |
| Primary particle size (nm) | 2,500 | 80 | 500 | 500 | 500 | 500 | 500 | 500 | 500 |
| Molar fraction (%) | 60 | 60 | 60 | 60 | 60 | 60 | 60 | 60 | 60 |
| Rare earth oxide |  |  |  |  |  |  |  |  |  |
| Type | $Y_2O_3$ | $Y_2O_3$ | $Y_2O_3$ | $Y_2O_3$ | $Y_2O_3$ | $Y_2O_3$ | $Y_2O_3$ | $Y_2O_3$ | $Y_2O_3$ |
| Primary particle size (nm) | 100 | 500 | 3,000 | 50 | 500 | 500 | 500 | 500 | 500 |
| Molar fraction (%) | 40 | 40 | 40 | 40 | 40 | 40 | 40 | 40 | 40 |
| Sintering aid |  |  |  |  |  |  |  |  |  |
| Type | $ZrO_2$ | $ZrO_2$ | $ZrO_2$ |  — |  — | $Ta_2O_5$ | $ZrO_2$ | $ZrO_2$ | $ZrO_2$ |
| Addition amount (wt %) | 0.5 | 0.5 | 0.5 | 0.5 |  — | 0.2 | 0.5 | 0.5 | 0.5 |
| Calcining |  |  |  |  |  |  |  |  |  |
| Temperature (° C.) | 400 | 400 | 400 | 400 | 400 | 400 | 400 | 300 | 1,100 |
| Atmosphere | air | air | air | air | air | air | nitrogen | air | air |
| Piring |  |  |  |  |  |  |  |  |  |
| Temperature (° C.) | 1,400 | 1,400 | 1,400 | 1,400 | 1,400 | 1,400 | 1,400 | 1,400 | 1,400 |
| Time (hr) | 4 | 4 | 4 | 4 | 4 | 4 | 4 | 4 | 4 |
| Atmosphere | vacuum | vacuum | vacuum | vacuum | vacuum | vacuum | vacuum | vacuum | vacuum |
| HIP |  |  |  |  |  |  |  |  |  |
| Temperature (° C.) | 1,600 | 1,600 | 1,600 | 1,600 | 1,600 | 1,600 | 1,600 | 1,600 | 1,600 |
| Time (hr) | 2 | 2 | 2 | 2 | 2 | 2 | 2 | 2 | 2 |
| Pressure medium | Ar | Ar | Ar | Ar | Ar | Ar | Ar | Ar | Ar |
| Pressure (MPa) | 98 | 98 | 98 | 98 | 98 | 98 | 98 | 98 | 98 |
| Annealing |  |  |  |  |  |  |  |  |  |
| Temperature (° C.) | 1,800 | 1,800 | 1,800 | 1,800 | 1,800 | 1,800 | 1,800 | 1,800 | 1,800 |
| Time (hr) | 4 | 4 | 4 | 4 | 4 | 4 | 4 | 4 | 4 |
| Atmosphere | vacuum | vacuum | vacuum | vacuum | vacuum | vacuum | vacuum | vacuum | vacuum |

TABLE 8-continued

| | Comparative Example | | | | | | | | |
|---|---|---|---|---|---|---|---|---|---|
| | 1 | 2 | 3 | 4 | 5 | 6 | 7 | 8 | 9 |
| Machining | | | | | | | | | |
| Peripheral machining | grinding | grinding | grinding | grinding | grinding | grinding | grinding | grinding | grinding |
| End face machining | etching | etching | etching | etching | etching | etching | etching | etching | etching |
| Sintered body | | | | | | | | | |
| Primary grain size (μm) | 50 | 2 | 40 | 1 | 2 | 10 | 0.5 | 2 | 10 |
| Transmittance | | | | | | | | | |
| @ 600 nm | 58 | 56 | 59 | 58 | 60 | 61 | 55 | 58 | 57 |
| @ 1,000 nm | 58 | 66 | 68 | 67 | 70 | 70 | 65 | 65 | 68 |
| Insertion loss | | | | | | | | | |
| (dB) | 2.0 | 2.2 | 2.1 | 2.1 | 1.0 | 1.0 | 2.5 | 2.1 | 2.1 |
| Extinction loss | | | | | | | | | |
| (dB) | 32 | 31 | 30 | 30 | 28 | 29 | 32 | 36 | 32 |
| Refractive index change | | | | | | | | | |
| $\Delta n \times 10^{-5}$ | 4 | 4 | 6 | 6 | 7 | 3 | 6 | 6 | 7 |
| Crystalline structure as sintered | cubic | cubic | cubic | cubic | cubic + partial monoclinic | cubic + partial monoclonic | cubic | cubic | cubic |

TABLE 9

| | Comparative Example | | | | | |
|---|---|---|---|---|---|---|
| | 10 | 11 | 12 | 13 | 14 | 15 |
| Terbium oxide source powder | | | | | | |
| Primary particle size (nm) | 500 | 500 | 500 | 500 | 500 | 500 |
| Molar fraction (%) | 60 | 60 | 60 | 60 | 60 | 60 |
| Rare earth oxide | | | | | | |
| Type | $Y_2O_3$ | $Y_2O_3$ | $Y_2O_3$ | $Y_2O_3$ | $Y_2O_3$ | $Y_2O_3$ |
| Primary particle size (nm) | 500 | 500 | 500 | 500 | 500 | 500 |
| Molar fraction (%) | 40 | 40 | 40 | 40 | 40 | 40 |
| Sintering aid | | | | | | |
| Type | $HfO_2$ | $HfO_2$ | $HfO_2$ | $HfO_2$ | $HfO_2$ | $HfO_2$ |
| Addition amount (wt %) | 0.5 | 0.5 | 0.5 | 0.5 | 0.5 | 0.5 |
| Calcining | | | | | | |
| Temperature (° C.) | 400 | 400 | 400 | 400 | 400 | 400 |
| Atmosphere | air | air | air | air | air | air |
| Piring | | | | | | |
| Temperature (° C.) | 1,300 | 1,700 | 1,600 | 1,600 | 1,600 | 1,600 |
| Time (hr) | 4 | 4 | 4 | 4 | 4 | 4 |
| Atmosphere | vacuum | vacuum | 1% oxygen + argon | vacuum | vacuum | vacuum |
| HIP | | | | | | |
| Temperature (° C.) | 1,600 | 1,600 | 1,600 | 1,300 | 1,900 | 1,800 |
| Time (hr) | 2 | 2 | 2 | 2 | 2 | 2 |
| Pressure medium | Ar | Ar | Ar | Ar | Ar | Ar |
| Pressure (MPa) | 49 | 49 | 49 | 49 | 49 | 12 |
| Annealing | | | | | | |
| Temperature (° C.) | 1,800 | 1,800 | 1,800 | 1,800 | 1,800 | 1,800 |
| Time (hr) | 48 | 48 | 48 | 48 | 48 | 48 |
| Atmosphere | vacuum | vacuum | vacuum | vacuum | vacuum | vacuum |
| Machining | | | | | | |
| Peripheral machining | grinding | grinding | grinding | grinding | grinding | grinding |
| End face machining | etching | etching | etching | etching | etching | etching |
| Sintered body | | | | | | |
| Primary grain size (μm) | 0.4 | 120 | 8 | 0.5 | 200 | 10 |

TABLE 9-continued

| | Comparative Example | | | | | |
|---|---|---|---|---|---|---|
| | 10 | 11 | 12 | 13 | 14 | 15 |
| Transmittance | | | | | | |
| @ 600 nm | 58 | 62 | 56 | 57 | 62 | 58 |
| @1,000 nm | 68 | 69 | 68 | 68 | 72 | 67 |
| Insertion loss | | | | | | |
| (dB) | 1.0 | 1.1 | 2.0 | 2.0 | 0.98 | 2 |
| Extinction loss | | | | | | |
| (dB) | 33 | 35 | 30 | 32 | 28 | 32 |
| Refractive index change | | | | | | |
| $\Delta n \times 10^{-5}$ | 4 | 6 | 7 | 7 | 3 | 7 |
| Crystalline structure as sintered | cubic | cubic | cubic | cubic | cubic | cubic |

REFERENCE SIGNS LIST 300 optical isolator
310 Faraday rotator
312 optical axis
320 polarizer
330 analyzer
340 magnet
350 housing

The invention claimed is:

1. A method for manufacturing a transparent ceramic material, comprising:

the first step (1) of grinding and mixing source powders including (a) terbium oxide, (b) at least one oxide selected from among yttrium oxide, scandium oxide, and a lanthanide rare earth oxide, and (c) a sintering aid which does not cause any heterophase but cubic to precipitate in the crystal structure of a terbium oxide-based ceramic material, said source powders (a) and (b) having same mean primary particle size of 30 to 2,000 nm, the second step (2) of shaping the powder mix to form a green compact and calcining the green compact at 400 to 1,000° C. in an oxidizing atmosphere to form a calcined body, or calcining the powder mix at 400 to 1,000° C. in an oxidizing atmosphere and shaping the powder mix to form a calcined body, the third step (3) of firing the calcined body at 1,400 to 1,700° C. in a non-oxidizing atmosphere to form a fired body, and the fourth step (4) of pressure firing the fired body at 1,400 to 1,800° C. under a pressure of 19 to 196 MPa to form a pressure fired body.

2. The method of claim 1, further comprising the step of annealing the pressure fired body at 1,500 to 2,000° C. in an oxygen-free atmosphere.

3. The method of claim 1, wherein the sintering aid is an oxide, fluoride or nitride of an element selected from among titanium, zirconium, hafnium and calcium.

4. The method of claim 1, wherein terbium oxide (chemical formula: $Tb_2O_3$) (a) and the oxide (b) are provided that their total is 100 mol % in molar fraction, terbium oxide (a) is 40 to 60 mol %, with the balance being the oxide (b).

* * * * *